(12) United States Patent
Rössel et al.

(10) Patent No.: US 8,798,654 B2
(45) Date of Patent: Aug. 5, 2014

(54) SELECTIVE INTERFERENCE REJECTION COMBINING

(75) Inventors: Sabine Rössel, Munich (DE); Esa Tapani Tiirola, Kempele (FI); Olli Juhani Piirainen, Oulu (FI); Ji Jun Luo, Munich (DE); Ingo Viering, Munich (DE); Mikko Kalevi Taskinen, Espoo (FI); Timothy Paul, Atlanta, GA (US); Josef Forster, Kipfenberg (DE); Markku Juha Vainikka, Kiviniemi (FI); Carsten Ritterhoff, Olching (DE)

(73) Assignee: Nokia Siemens Networks Oy, Espoo (FI)

( * ) Notice: Subject to any disclaimer, the term of this patent is extended or adjusted under 35 U.S.C. 154(b) by 299 days.

(21) Appl. No.: 13/265,671

(22) PCT Filed: Apr. 22, 2009

(86) PCT No.: PCT/EP2009/054854
§ 371 (c)(1),
(2), (4) Date: Dec. 19, 2011

(87) PCT Pub. No.: WO2010/121657
PCT Pub. Date: Oct. 28, 2010

(65) Prior Publication Data
US 2012/0115520 A1    May 10, 2012

(51) Int. Cl.
*H04B 15/00* (2006.01)
(52) U.S. Cl.
USPC ........... 455/501; 455/302; 342/159; 375/148; 375/346
(58) Field of Classification Search
CPC ............................. H04B 1/1027; H04W 16/14
USPC .......................................................... 455/501
See application file for complete search history.

(56) References Cited

U.S. PATENT DOCUMENTS

| | | | | |
|---|---|---|---|---|
| 5,432,821 A | * | 7/1995 | Polydoros et al. | 375/340 |
| 5,528,581 A | * | 6/1996 | De Bot | 370/203 |
| 5,848,105 A | * | 12/1998 | Gardner et al. | 375/336 |
| 5,848,361 A | * | 12/1998 | Edwards | 455/562.1 |
| 6,128,355 A | * | 10/2000 | Backman et al. | 375/347 |

(Continued)

FOREIGN PATENT DOCUMENTS

| | | |
|---|---|---|
| WO | WO 98/53560 | 11/1998 |
| WO | WO 99/39444 | 8/1999 |

OTHER PUBLICATIONS

3GPP TS 36.211 V8.6.0 (Mar. 2009), "3$^{rd}$ Generation Partnership Project; Technical Specification Group Radio Access Network; Evolved Universal Terrestrial Radio Access (E-UTRA); Physical Channels and Modulation (Release 8)", 83 pgs.

*Primary Examiner* — Hai V Nguyen
(74) *Attorney, Agent, or Firm* — Harrington & Smith

(57) ABSTRACT

It is provided a method, including deciding, based on a previously estimated interference value, whether a user equipment or a sounding reference signal or a channel of a received uplink signal is affected by a colored interference more than a first predefined threshold, wherein colored interference is an interference having a spatial and/or spectral predominance; and suppressing interference rejection combining on the uplink signal if none of the user equipment, the sounding reference signal, and the channel of the received uplink signal is affected more than the first predefined threshold.

18 Claims, 5 Drawing Sheets

(56) References Cited

U.S. PATENT DOCUMENTS

| | | | |
|---|---|---|---|
| 6,131,013 A * | 10/2000 | Bergstrom et al. | 455/63.1 |
| 6,172,970 B1 * | 1/2001 | Ling et al. | 370/347 |
| 6,175,587 B1 * | 1/2001 | Madhow et al. | 375/148 |
| 6,215,814 B1 * | 4/2001 | Ylitalo et al. | 375/148 |
| 6,314,147 B1 * | 11/2001 | Liang et al. | 375/346 |
| 6,529,545 B2 * | 3/2003 | Tiirola et al. | 375/148 |
| 6,606,058 B1 * | 8/2003 | Bonek et al. | 342/383 |
| 6,701,165 B1 * | 3/2004 | Ho et al. | 455/562.1 |
| 7,031,411 B2 * | 4/2006 | Arslan et al. | 375/346 |
| 7,054,663 B2 * | 5/2006 | Frey et al. | 455/562.1 |
| 7,092,463 B1 * | 8/2006 | Cedervall et al. | 375/346 |
| 7,231,007 B2 * | 6/2007 | Artamo et al. | 375/347 |
| 7,269,238 B2 * | 9/2007 | Lee et al. | 375/346 |
| 7,299,017 B2 * | 11/2007 | Pajukoski et al. | 455/137 |
| 7,587,007 B2 * | 9/2009 | Alamouti et al. | 375/347 |
| 7,602,866 B2 * | 10/2009 | Olsson et al. | 375/346 |
| 7,653,160 B2 * | 1/2010 | Piirainen | 375/346 |
| 7,796,956 B2 * | 9/2010 | Khayrallah et al. | 455/75 |
| 7,826,574 B2 * | 11/2010 | Wu et al. | 375/349 |
| 7,885,318 B2 * | 2/2011 | Saily et al. | 375/148 |
| 7,929,593 B2 * | 4/2011 | Khayrallah et al. | 375/148 |
| 7,929,985 B2 * | 4/2011 | Khayrallah et al. | 455/550.1 |
| 7,965,619 B2 * | 6/2011 | Taira et al. | 370/203 |
| 8,050,288 B2 * | 11/2011 | Kapoor et al. | 370/465 |
| 8,064,531 B2 * | 11/2011 | Molnar | 375/260 |
| 8,121,565 B2 * | 2/2012 | Rhee et al. | 455/137 |
| 8,144,572 B2 * | 3/2012 | Shoemake et al. | 370/208 |
| 8,275,074 B2 * | 9/2012 | Reial et al. | 375/340 |
| 8,311,162 B2 * | 11/2012 | Jongren | 375/340 |
| 8,351,545 B2 * | 1/2013 | Alamouti et al. | 375/299 |
| 8,355,475 B2 * | 1/2013 | Alamouti et al. | 375/347 |
| 8,380,154 B2 * | 2/2013 | Lindqvist et al. | 455/296 |
| 8,396,438 B2 * | 3/2013 | Akkarakaran et al. | 455/278.1 |
| 8,412,520 B2 * | 4/2013 | Furuta et al. | 704/226 |
| 8,467,462 B2 * | 6/2013 | Hamaguchi et al. | 375/260 |
| 8,521,090 B2 * | 8/2013 | Kim et al. | 455/63.1 |
| 8,565,681 B2 * | 10/2013 | Kim et al. | 455/63.1 |
| 8,566,086 B2 * | 10/2013 | Giesbrecht et al. | 704/225 |
| 8,699,448 B2 * | 4/2014 | Lindqvist et al. | 370/330 |
| 2004/0102967 A1 * | 5/2004 | Furuta et al. | 704/226 |
| 2004/0203456 A1 * | 10/2004 | Onggosanusi et al. | 455/67.13 |
| 2004/0219959 A1 * | 11/2004 | Khayrallah et al. | 455/575.7 |
| 2005/0101253 A1 * | 5/2005 | Pajukoski et al. | 455/63.1 |
| 2005/0111596 A1 * | 5/2005 | Olsson et al. | 375/346 |
| 2006/0056549 A1 * | 3/2006 | Arslan et al. | 375/346 |
| 2006/0291596 A1 * | 12/2006 | Piirainen | 375/346 |
| 2007/0072551 A1 * | 3/2007 | Pajukoski et al. | 455/63.1 |
| 2007/0107013 A1 * | 5/2007 | Seppala et al. | 725/39 |
| 2007/0161361 A1 * | 7/2007 | Vaisanen et al. | 455/302 |
| 2007/0201408 A1 * | 8/2007 | Tiirola et al. | 370/335 |
| 2008/0059165 A1 * | 3/2008 | Furuta et al. | 704/226 |
| 2008/0064337 A1 * | 3/2008 | Saily et al. | 455/63.1 |
| 2008/0112517 A1 * | 5/2008 | Parts et al. | 375/346 |
| 2008/0123516 A1 * | 5/2008 | Anderson et al. | 370/208 |
| 2008/0212666 A1 * | 9/2008 | Kuchi et al. | 375/231 |
| 2008/0231500 A1 * | 9/2008 | Heikkila et al. | 342/159 |
| 2008/0240282 A1 * | 10/2008 | Lin | 375/285 |
| 2009/0286482 A1 * | 11/2009 | Gorokhov et al. | 455/63.1 |
| 2009/0286562 A1 * | 11/2009 | Gorokhov | 455/501 |
| 2010/0104037 A1 * | 4/2010 | Jongren | 375/260 |
| 2010/0208847 A1 * | 8/2010 | Reial et al. | 375/340 |
| 2010/0226515 A1 * | 9/2010 | Fischer | 381/317 |
| 2010/0260103 A1 * | 10/2010 | Guey et al. | 370/328 |
| 2011/0103520 A1 * | 5/2011 | Molnar | 375/340 |
| 2011/0171920 A1 * | 7/2011 | Kim et al. | 455/257 |
| 2013/0044650 A1 * | 2/2013 | Barker et al. | 370/278 |
| 2013/0170574 A1 * | 7/2013 | Fleming et al. | 375/267 |
| 2013/0172050 A1 * | 7/2013 | Fleming et al. | 455/562.1 |

\* cited by examiner

SELECTIVE INTERFERENCE REJECTION COMBINING

FIELD OF THE INVENTION

The present invention relates to an apparatus, a method, and a computer program product for selective interference rejection combining.

BACKGROUND OF THE INVENTION

Especially in frequency bands now coming up for mobile broadband use—like for example the 700 MHz frequency bands of long term evolution (LTE) systems in the U.S. and in Europe—there are often Digital TV, Mobile TV, or Media-FLO spectrum allocations next to an LTE spectrum allocation. For the remainder of this description, MediaFLO is taken as an example for a strong extra-system interferer.

MediaFLO is a technology to transmit data to portable devices such as cell phones and PDAs, used for mobile TV. In the United States, the MediaFLO system uses the frequency spectrum 716-722 MHz.

Hence, on top of the intra-system (inter-cell) interference inside the LTE system, MediaFLO base station transmitters interfere with the LTE base station receiver. This type of interference can be characterized as spatially and spectrally coloured. The MediaFLO interference power depends on the antenna tilting, transmission power, and the transmit filter of the MediaFLO base station as well as on the LTE antenna tilting and the guard band between the MediaFLO transmit and the LTE receive channels. At average the MediaFLO interference power at the spectrally closest LTE Physical Resource Block (PRB) may be up to 50 dB above the noise level for tight coexistence situations, and up to 30 dB in realistic coexistence situations, while typical intra-system average interference power is expected to be 5 to 10 dB above the noise level.

Without Uplink Inter-Cell Interference Coordination, intra-system interference for a full Frequency Reuse 1 scenario is (at average) equal for all PRBs of the LTE channel allocation while adjacent channel leakage from MediaFLO creates high interference on PRBs spectrally close to the MediaFLO channel and low interference on PRBs spectrally further away from the MediaFLO channel.

FIG. 1 illustrates a simulation of interference from adjacent channel leakage into a 10 MHz LTE channel from a very strong extra-system interferer like MediaFLO. The frequency scale is indicted relative to the frequency of the interferer. Line 11 marks the noise floor (reference bandwidth in this case is 500 KHz); line 12 marks the average interference power from the extra-system interferer, and line 13 marks the interference rise on the LTE base station receiver as the orthogonal frequency division multiplex (OFDM) SINC( ) functions' side lobes take-in the interferer's leakage power even on physical resource blocks (PRBs) spectrally further away from the interferer.

In an LTE Frequency Reuse 1 network interfered from MediaFLO, the application of Interference Rejection Combining on a full 10 MHz or even 20 MHz channel with 2, 4, or even more LTE receive antennas creates such a computational effort potentially exceeding available processing capacity of the LTE base station.

SUMMARY OF THE INVENTION

It is an object of the present invention to improve the prior art.

According to a first aspect of the present invention, there is provided a method comprising deciding, based on a previously estimated interference value, whether a user equipment or a sounding reference signal or a channel of a received uplink signal is affected by a colored interference more than a first predefined threshold, wherein colored interference is an interference having a spatial and/or spectral predominance; and suppressing interference rejection combining on the uplink signal if none of the user equipment, the sounding reference signal, and the channel of the received uplink signal is affected more than the first predefined threshold.

Modifications of the first aspect may be as follows:

The method may further comprise performing interference rejection combining for the uplink signal, if it is decided that at least one of the user equipment, the sounding reference signal, and the channel is affected by colored interference more than the first predefined threshold.

In the method, the uplink signal may comprises more than one partial subband including a first partial subband, and the method may further comprise splitting the uplink signal into an uplink signal of the first partial subband and at least one uplink signal of the remaining subband; deciding, based on a previously estimated interference value of the first partial subband, whether or not the uplink signal of the first partial subband is affected by colored interference more than a second predefined threshold; and wherein the performing interference rejection combining for the uplink signal comprises suppressing interference rejection combining for the uplink signal of the first partial subband, if it is decided that the uplink signal of the first partial subband is not affected more than the second predefined threshold.

In the method, the uplink band may comprise more than one subband, and the method may further comprise selecting at least one of the subbands affected more than the first predefined threshold into a first selection, and/or selecting at least one of the subbands affected not more than the first predefined threshold into a second selection; and allocating at least one of the subbands of the first selection to the user equipment, the sounding reference signal, or the channel according to a first predefined criterion, and/or allocating at least one of the subbands of the second selection to the user equipment, the signal, or the channel according to a second predefined criterion.

In the method, the deciding may be based on the allocating.

The method may further comprise estimating a colored interference of the uplink signal or of the uplink signal of the first partial subband; and updating the interference value of the subband or of the first partial subband based on the estimated colored interference.

The method may further comprise averaging the estimated colored interference over at least one of time, different user equipments, different sounding reference signals, and different channels; and the updating may be based on the averaged estimated colored interference.

In the method, the uplink may be an uplink of a single carrier frequency division multiplex access, and wherein performing interference rejection combining in the frequency domain for data and demodulation reference symbols of a pilot is performed with respect to a pre-coded transmit alphabet.

According to a second aspect of the invention, there is provided an apparatus, comprising deciding means configured to decide, based on a previously estimated interference value, whether or not a user equipment or a sounding reference signal or a channel of an uplink signal is affected by a colored interference more than a first predefined threshold, wherein colored interference is an interference having a spatial and/or spectral predominance; and switching means configured to suppress subjecting the uplink signal to a treatment by an interference rejection combining means configured to perform interference rejection combining, if it is decided by the deciding means that none of the user equipment, the sounding reference signal, and the channel is affected more than the first predefined threshold.

Modifications of the second aspect may be as follows:

The apparatus may further comprise interference rejection combining means configured to perform interference rejection combining on the uplink signal; wherein the switching means is further configured to subject the uplink signal to a treatment by the interference rejection combining means, if it is decided by the deciding means that at least one of the user equipment, the sounding reference signal, and the channel is affected more than the first predefined threshold.

In the apparatus, the uplink signal may comprise more than one partial subband including a first partial subband, the apparatus may further comprise splitting means configured to split the uplink signal into an uplink signal of the first partial subband and at least one uplink signal of the remaining subband; wherein the decision means may be further configured to decide, based on a previously estimated interference value of the first partial subband, whether or not the uplink signal of the first partial subband is affected by colored interference more than a second predefined threshold; the switching means may be further configured to suppress subjecting the uplink signal of the first partial subband to a treatment by the interference rejection combining means, if it is decided by the deciding means that the uplink signal of the first partial subband is not affected more than the second predefined threshold.

In the apparatus, the uplink band may comprise more than one subband, the apparatus may further comprise selecting means configured to select at least one of the subbands affected more than the first predefined threshold into a first selection and/or to select at least one of the subbands affected not more than the first predefined threshold into a second selection; and allocating means configured to allocate at least one of the subbands of the first selection to the user equipment, the sounding reference signal, or the channel according to a first predefined criterion, and/or to allocate at least one of the subbands of the second selection to the user equipment, the sounding reference signal, or the channel according to a second predefined criterion.

In the apparatus, the deciding means may be configured to decide based on the allocation of the allocating means.

The apparatus may further comprise estimation means configured to estimate a colored interference of the uplink signal or of the uplink signal of the first partial subband; and updating means configured to update the interference value of the subband or of the first partial subband based on the estimated colored interference.

The apparatus may further comprise averaging means configured to average the estimated colored interference over at least one of a time, different user equipments, different signals, and different channels; and wherein the updating means may be further configured to update the interference value of the subband or the first partial subband based on the averaged estimated colored interference.

The apparatus may further comprise base station means configured to provide a base station functionality according to a radio access technology of the uplink.

According to a third aspect of the invention, there is provided an apparatus, comprising a decider configured to decide, based on a previously estimated interference value, whether or not a user equipment or a sounding reference signal or a channel of an uplink signal is affected by a colored interference more than a first predefined threshold, wherein colored interference is an interference having a spatial and/or spectral predominance; and a switch configured to suppress subjecting the uplink signal to a treatment by an interference rejection combiner configured to perform interference rejection combining, if it is decided by the decider that none of the user equipment, the sounding reference signal, and the channel is affected more than the first predefined threshold.

Modifications of the third aspect may be as follows:

The apparatus may further comprise an interference rejection combiner configured to perform interference rejection combining on the uplink signal; wherein the switch is further configured to subject the uplink signal to a treatment by the interference rejection combiner, if it is decided by the decider that at least one of the user equipment, the sounding reference signal, and the channel is affected more than the first predefined threshold.

In the apparatus, the uplink signal may comprise more than one partial subband including a first partial subband, the apparatus may further comprise a splitter configured to split the uplink signal into an uplink signal of the first partial subband and at least one uplink signal of the remaining subband; wherein the decider may be further configured to decide, based on a previously estimated interference value of the first partial subband, whether or not the uplink signal of the first partial subband is affected by colored interference more than a second predefined threshold; the switch may be further configured to suppress subjecting the uplink signal of the first partial subband to a treatment by the interference rejection combiner, if it is decided by the decider that the uplink signal of the first partial subband is not affected more than the second predefined threshold.

In the apparatus, the uplink band may comprise more than one subband, the apparatus may further comprise a selector configured to select at least one of the subbands affected more than the first predefined threshold into a first selection and/or to select at least one of the subbands affected not more than the first predefined threshold into a second selection; and an allocator configured to allocate at least one of the subbands of the first selection to the user equipment, the sounding reference signal, or the channel according to a first predefined criterion, and/or to allocate at least one of the subbands of the second selection to the user equipment, the sounding reference signal, or the channel according to a second predefined criterion.

In the apparatus, the decider may be configured to decide based on the allocation of the allocator.

The apparatus may further comprise an estimator configured to estimate a colored interference of the uplink signal or of the uplink signal of the first partial subband; and an updater configured to update the interference value of the subband or of the first partial subband based on the estimated colored interference.

The apparatus may further comprise an averager configured to average the estimated colored interference over at least one of a time, different user equipments, different signals, and different channels; and wherein the updater may be further configured to update the interference value of the subband or the first partial subband based on the averaged estimated colored interference.

The apparatus may further comprise a base station processor configured to provide a base station functionality according to a radio access technology of the uplink.

According to a fourth aspect of the invention, there is provided an eNodeB of a long term evolution system comprising an apparatus according to the second or third aspect of the invention.

According to a fifth aspect of the invention, there is provided a computer program product embodied on a computer-readable medium, comprising program instructions which perform, when run on a computer, the execution of which results in operations of the method according to the first aspect of the invention.

It is to be understood that any of the above modifications can be applied singly or in combination to the respective aspects to which they refer, unless they are explicitly stated as excluding alternatives.

Further, it is to be understood that a method according to the first aspect may be performed in an apparatus according to the second or third aspect and that a computer program product according to the fourth aspect may be executed in an apparatus according to the second and third aspect.

Further details, features, objects, and advantages are apparent from the following detailed description of the preferred embodiments of the present invention which is to be taken in conjunction with the appended drawings, in which FIG. 1 shows a simulation of adjacent channel leakage from MediaFLO into 10 MHz LTE channel;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that an apparatus according to an embodiment is configured to perform a corresponding method, although in some cases only the apparatus or only the method are described.

In addition, embodiments are described with respect to LTE. However, LTE is only an example, and the present invention may be applied in embodiments according to any OFDM-based or SC-FDMA-based radio access technology or any radio access technology aggregated from narrower band component carriers (like e.g. GSM, LTE-Advanced or WiMAX).

The proposed method targets at minimizing the computational complexity by applying Uplink IRC selectively, e.g. only on selected user equipments (UEs), sounding reference signals, or channels. Preferably, uplink IRC is selectively applied to bandwidth portions with respect to the selected UEs, signals, or channels. Selective application is enabled based on an approximate a priori knowledge of the spectrally and/or spatially colored interference. Hereinafter, sounding reference signal is taken as an example of an uplink signal other than a channel, and sometimes in the present description and drawings, signal is used instead of sounding reference signal in the combination with user equipment and channel.

Examples for interference known a priori are other systems whose frequency band is neighbored to the system under consideration (e.g. MediaFLO neighbored to LTE), or are neighboring cells in the same network, wherein Uplink Inter-Cell Interference Coordination (UL ICIC) is deployed.

Figure 6A:
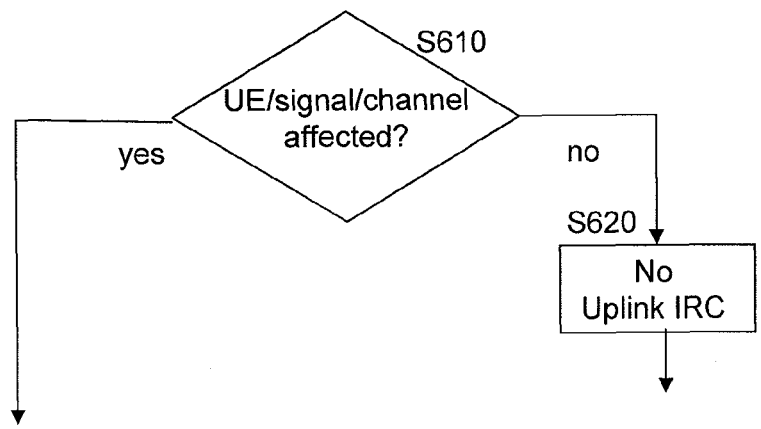
FIG. 6a shows a method according to an embodiment.

FIG. 6a shows a method according to an embodiment. In step S610, it is decided whether or not the user equipment or the sounding reference signal or the channel of an uplink signal is affected by colored interference more than a predetermined threshold. Colored interference is interference with a spectral and/or spatial predominance. Usually, an uplink signal has a known or predetermined time allocation. If this is not the case, no uplink interference rejection combining (IRC) is performed (S620).

Figure 6B:
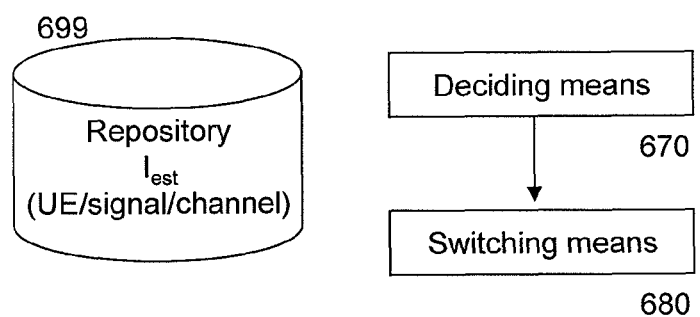
FIG. 6b shows an apparatus according to an embodiment.

FIG. 6b shows an apparatus configured to perform the method according to FIG. 6a. It consists of a deciding means 670 configured to decide whether the user equipment or the sounding reference signal or the channel of an uplink signal is affected by colored interference more than a predetermined threshold, and a switching means 680 configured to subject the uplink signal to another treatment than interference rejection combining if it is not affected by colored interference more than a predetermined threshold. The decision of the deciding means is based on an estimated interference value stored in the repository 699. The repository 699 may be a database, a memory or another suitable means for storing an interference value temporarily or in some embodiments permanently.

Figure 3:
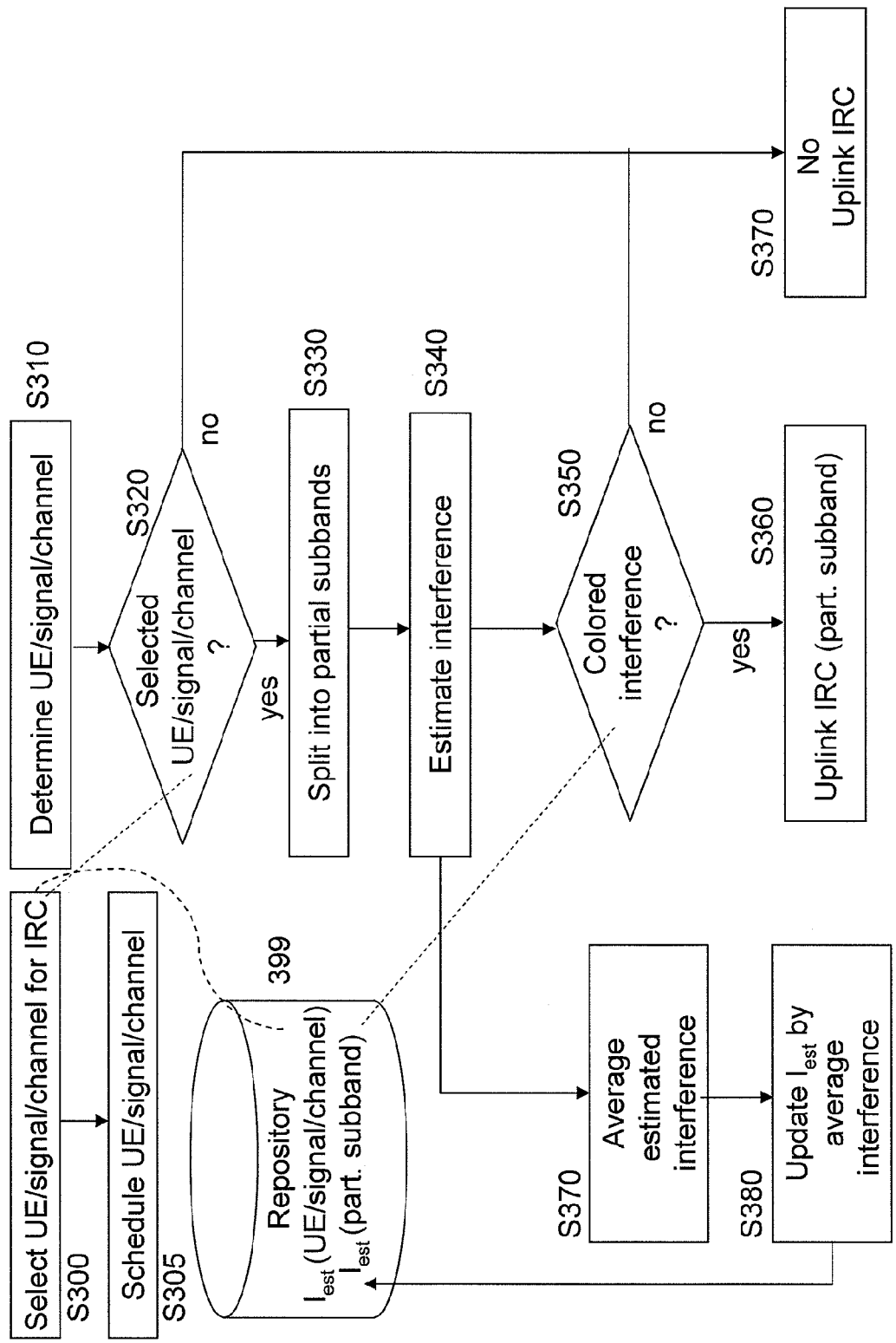
FIG. 3 shows a method of selective uplink IRC according to an embodiment.

FIG. 3 shows another exemplary method for selective interference rejection combining. In addition to the method of FIG. 6a, the method of FIG. 3 shows interference rejection combining (IRC) and updating the interference value $I_{est}$ in the repository, selectively performing interference rejection combining for a selected UE/signal/channel, and scheduling taking into account colored interference.

According to FIG. 3, a UE/signal/channel is selected for IRC (S300). The selection is based on the estimated interference values stored in the repository 399. Then, in step S305, a UE/signal/channel is accordingly scheduled.

In step S310, the UE/signal or channel of a received uplink signal is determined. In step S320, it is decided if the determined UE/signal/channel is one of the UEs/signals or channels selected for IRC in step S300. If this is not the case, no uplink IRC is performed on the received uplink signal (S370).

If the UE/signal/channel is selected for IRC, the uplink signal may be split into signals of partial subbands (S330). An interference may be estimated for each of the partial subbands (S340). The interference estimation may comprise calculation of an interference covariance matrix as outlined below. The estimated interference is used for uplink IRC in step S360.

In step S350, it is decided based on an interference value of the partial subband stored in the repository 399 whether or not the partial subband is affected by colored interference more than a predefined threshold. If this is not the case, no uplink IRC is performed on the uplink signal of this partial subband (S370).

Otherwise, interference rejection combining (IRC) is performed for the uplink signal of the partial subband (S360). In interference rejection combining, the estimated interference is combined with the original uplink signal to obtain a signal with reduced or even not influence of interference.

Furthermore, in step S370, the estimated interference of step S340 may be averaged, e.g. over at least one of a transmission time interval (TTI), or more than one user equipmentor sounding reference signal or channel. In step S380, the estimated interference $I_{est}$ in the repository 399 is updated by the averaged estimated interference obtained in step S370.

In some embodiments averaging S370 may be omitted. Also, in some embodiments, updating S380 may be omitted, too, and the interference values $I_{est}$ in the repository may remain constant over time.

In order to cope with extra-system interference or UL ICIC implied colored interference on the one side and optimizing the computational effort for Interference Rejection Combining on the other side, some embodiments according to the present invention may have one or more of the following:

(a) Knowledge of spectrally and spatially colored interference may be exploited to select which UEs or signals or channels are subject to Interference Rejection Combining (IRC) and which ones are subject to non-IRC techniques (e.g. maximum ratio combining, MRC) only. This is called Selective Uplink IRC.

(b) The interference from a Digital TV, MediaFLO, MobileTV, other extra-system telecommunication or broadcast base station may be sufficiently static such that interference estimations may be performed on a "long-term" time scale and averaged across different UEs, different signals, or different channels thereby further reducing the complexity of Selective Uplink IRC.

(c) Knowledge of spectrally and spatially colored (dynamic) interference may be caused in a network deployment with Uplink Inter-Cell Interference Coordination (UL ICIC). Hence, Selective Uplink IRC finds an application case in UL ICIC as well.

(d) The Selective Uplink IRC may be performed in such a way—that despite or independent from a pre-selection of UEs or signals or channels as stated in (a)—IRC is also applied selectively inside the (pre-)selected UE's or signal's or channel's sub-band, e.g. in PRB granularity.

(e) The knowledge of spectrally and spatially colored interference may be used by an interference-aware Uplink scheduler which (pre-) selects UEs or signals or channels for allocation in the heavily interfered part of the carrier spectrum. UEs or signals or channels in the heavily interfered part of the spectrum are then subject to IRC; those allocated in the less affected part of the spectrum are not. Thereby the interference-aware Uplink scheduler can further optimize IRC usage because IRC performs better e.g. on lower Modulation and Coding scheme(s).

(f) As a preferred implementation for SC-FDMA, frequency domain IRC is performed with respect to a pre-coded transmit alphabet for the SC-FDMA data and the frequency-domain demodulation reference symbols for the SC-FDMA pilots. This eases to apply IRC selectively (e.g. on PRB resolution level) within a single UE SC-FDMA signal. However, selective Uplink IRC inside the (pre-)selected UE or signal or channel can also be done in time domain.

Concerning (a) and (b):

Knowledge of spectrally and/or spatially colored interference is exploited to select which UEs or signals or channels are subject to IRC and which ones are subject to non-IRC techniques (e.g. MRC) only. This is called Selective Uplink IRC.

This means that the interference estimation is simplified by means of a configurable or an estimated or a measured or an interference-detected interference value ($I_{est}$) stored in the repository 399 (computational complexity reduction #1).

This value may be updated with an averaging on a per allocation time scale (at least 1 TTI) per UE or signal or channel.

The interference from a Digital TV, MediaFLO, or MobileTV broadcast base station may be sufficiently static such that interference estimations may be performed on a "long-term" time scale and averaged across different UEs and/or different signals and/or different channels thereby further reducing the complexity of Selective Uplink IRC.

This means that the configurable or estimated or measured or interference-detected interference value in the repository is updated with "long-term" averaging over time and/or across different UEs and/or different signals and/or different channels allocated at different times (computational complexity reduction #2).

For the plain frequency-domain SC-FDMA Uplink IRC, the following computational complexity can be assumed:

Channel estimation per UE: a1*#PRBs+b1

Noise & interference est. per UE: a2*#PRBs+b2

Entries into covariance matrix:

a3*#PRBs*#DivPaths+b3

Covariance matrix inversion:

a4*#PRBs*(#DivPaths)^3+b4

This results in an estimation for the complexity of IRC in dependence of the number of PRBs (#PRBs) and number of diversity paths (#DivPaths):

Complexity (IRC)

PRBs*((#DivPaths)^3+c0*#DivPaths+c1)

Approximated computational complexity is cubic in the number of diversity paths and linear in the number of PRBs.

As the IRC complexity shows an approximately linear dependency on the size of the bandwidth it is applied to, spectrum-selective application of the Uplink IRC can reduce computational effort significantly.

For example for a realistic MediaFLO leakage power interference, about 10 out of 50 PRBs may be strongly interfered and require IRC processing. In applying the IRC only to the 10 out of 50 PRBs for a 10 MHz LTE carrier will reduce the actual IRC complexity compared to a full-band IRC by a factor of 5.

Concerning (c)

Knowledge of spectrally and spatially colored (dynamic) interference may be caused in a network deployment with Uplink Inter-Cell Interference Coordination (UL ICIC). Hence, Selective Uplink IRC finds an application case in UL ICIC as well. However, only computational complexity reduction #1 may be applied in this case, as intra-system (inter-cell) interference may be considered as dynamic.

Concerning (d)

In addition to selectively performing IRC to selected UEs, signals, or channels, IRC may be applied selectively inside a UE or signal or channel. For example, within a single UE or a single SC-FDMA some part of the SC-FDMA's sub-band, e.g. a physical resource block (PRB), is subject to IRC and the less interfered part is subject to non-IRC, e.g. MRC receiver technique.

Concerning (e)

In amendment of the method pre-scribed under (a) to (d), an interference-aware UL scheduler of layer 2 may pre-select UEs and/or signals and/or channels for IRC in the heavily interfered region and smartly select UEs and/or signals and/or channels fit for a heavily interfered region.

This selection step may be the only selection step in some embodiments, but may be combined with some of the selection steps described under (a) to (d) in other embodiments. In the latter case, the interference-aware UL scheduler may provide a (pre-) selection step which further optimizes the usage of IRC because IRC performs better e.g. on lower Modulation and Coding scheme(s).

Again, computational complexity for the Selective Uplink IRC is reduced based on knowledge of an extra-system interferer (like MediaFLO) or inter-cell intra-system interference from UL ICIC as interference estimation and interference rejection combining may be bypassed.

Figure 1:
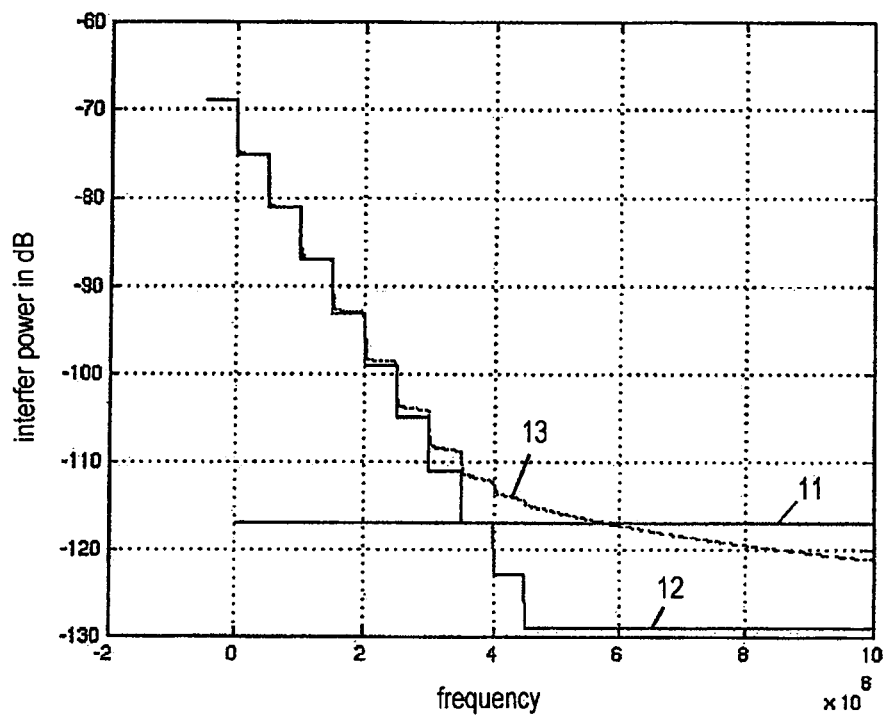
Figure 2:
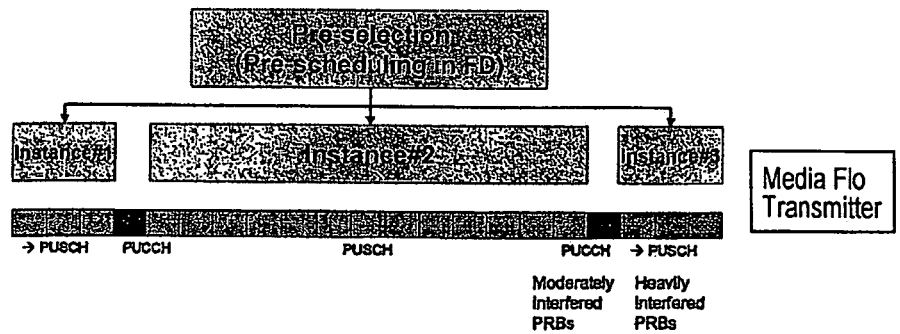
FIG. 2 shows schematically upload scheduling of an interference-aware uplink PUSCH scheduler in the presence of MediaFLO interference.

An example for such a pre-selection in the frequency domain (FD) is shown in FIG. 2. According to FIG. 2, the scheduler of the physical uplink shared channel (PUSCH) is aware of the presence of MediaFLO interference. It schedules an instance per PUSCH fragment. The PUSCH fragments are separated by physical resource blocks (PRB) of the physical uplink control channel (PUCCH). The scheduling in the frequency domain takes the MediaFLO interference into account and is based UE power headroom and Quality of Service (QoS) Class Indicator. According to FIG. 2, instance #1 of the UL scheduler is farthest away from MediaFLO band and is, therefore, not affected by MediaFLO interference. Instance #2 is slightly affected, frequency hopping may be deployed. It is the preferred PUSCH fragment for voice over IP (VoIP). Instance #3 is closest to the MediaFLO interference and, thus, is most heavily affected by MediaFLO interference. It is scheduled for UEs considered fit for being allocated to heavily interfered physical resource blocks.

Depending on the scheduler strategy, only predetermined signals or channels or UEs for heavily interfered PRBs may be scheduled, or in other words certain UEs or signals or channels may not be scheduled into these resources. E.g., PUSCH containing the delay-critical L1/L2 control signals may be kept in the spectrum having no inter-system interference. Similar rules may be applied e.g., to different hybrid automatic repeat request (HARQ) transmissions/re-transmissions.

In some embodiments, heavily interfered regions may be considered not to be allocated at all. If this is the case, IRC may be applied to the remainder of the LTE carrier spectrum in order to counter-act both (lower) extra-system interference plus intra-system interference.

Concerning (f):

The LTE Uplink is based on Single-Carrier Frequency Division Multiple Access (SC-FDMA), as e.g. defined by TS 36.211 v8.6.0. The stream of complex-valued symbols of the Physical Uplink Shared Channel (PUSCH) d(0), . . . , $d(M_{symb}-1)$ (encoded with a given Modulation and Coding Scheme (MCS) and scrambled with a UE-specific scrambling code) is divided into $M_{symb}/M_{sc}^{PUSCH}$ sets, each corresponding to one SC-FDMA symbol. PUSCH pre-coding transformation is then in accordance to (see TS 36.211 v8.6.0):

$$x(s \cdot M_{sc}^{PUSCH} + k) = \frac{1}{\sqrt{M_{sc}^{PUSCH}}} \sum_{i=0}^{M_{sc}^{PUSCH}-1} d(s \cdot M_{sc}^{PUSCH} + i) e^{-j\frac{2\pi i k}{M_{sc}^{PUSCH}}}$$

$$k = 0, \ldots, M_{sc}^{PUSCH} - 1$$

$$s = 0, \ldots, M_{symb}/M_{sc}^{PUSCH} - 1$$

This results in another block of complex-valued symbols $x(0,s), \ldots, x(M_{symb}-1,s)$ which are elements of a pre-coded alphabet.

Furthermore the LTE Uplink contains Demodulation Reference Symbols (DRS) for PUSCH; for details refer to TS 36.211 v8.6.0.

These consist of reference signal sequence $r_{u,v}^{(\alpha)}(n)$ being unique with respect to a given cyclic shift $\alpha$ of a base sequence $\bar{r}_{u,v}(n)$ according to TS 36.211 v8.6.0:

$$r_{u,v}^{(\alpha)}(n) = e^{j\alpha n} \bar{r}_{u,v}(n), 0 \leq n < M_{sc}^{PUSCH}$$

where $M_{sc}^{PUSCH}$ is the length of the reference signal sequence. Multiple reference signal sequences may be defined from a single base sequence through different values of $\alpha$.

The demodulation reference signal sequence $r^{PUSCH}(\cdot)$ for PUSCH is defined by $$r^{PUSCH}(m \cdot M_{sc}^{PUSCH} + n) = r_{u,v}^{(\alpha)}(n)$$

Where:

m=0,1

$n = 0, \ldots, M_{sc}^{PUSCH}-1$

The DRS for PUSCH is mapped to the same PRBs as the corresponding PUSCH channel. For the normal cyclic prefix and s=0,1,2,4,5, and 6 x(k,s) is an element of the PUSCH pre-coded alphabet and for s=3, x(k,s) is the DRS for the PUSCH channel.

The value x(k,s) is the $k^{th}$ IFFT coefficient of the $s^{th}$ SC-FDMA/OFDM symbol as follows. The time-continuous signal $X_s(t)$ of the Physical Uplink Shared Channel and the Demodulation Reference Symbols are created by an IFFT as follows (see TS 36.211 v8.6.0):

$$X_s(t) = \sum_{k=-\lfloor N_{RB}^{UL} N_{sc}^{RB}/2 \rfloor}^{\lceil N_{RB}^{UL} N_{sc}^{RB}/2 \rceil - 1} x(k^{(-)}, s) \cdot e^{j2\pi(k+s/2)\Delta f(t - N_{CP,s}T)}$$

for $0 \leq t < (N_{CP,s}+N) \times T$ where $k^{(-)} = k + \lfloor N_{RB}^{UL} N_{sc}^{RB}/2 \rfloor$, N=2048, $\Delta f$=15 kHz and x(k,s) is the content of resource element (k,s).

As a next step, performing IRC in the frequency domain means to operate on x(k,s), i.e. to perform interference rejection combining on x(k,s) and to perform channel, noise, and interference estimation based on DRS in x(k,s=3).

The receive signal vector on multiple receive antennas $\vec{r}$ ($r^p$ is the received signal on receive antenna p) may be combined for the diversity branches {p} to a complex combined receive signal y(k,s) in SC-FDMA symbol s by the weight vector $\underline{w}^H$ $$y(k,s) = \vec{w}^H(k,s)\vec{r}(k,s) = \vec{w}^H(k,s)H(k,s)x(k,s) + \vec{w}^H(k,s)\vec{I}(k,s)$$

In accordance to that, Interference Rejection Combining with an MMSE frequency domain equalization means to find a weight vector $\underline{w}(k,s)$ such that the decided element of (pre-coded) combination alphabet y(k,s) minimally deviates from the pre-coded (transmit) symbol x(k,s):

$$\vec{w}(k,s) = \underset{\vec{w}(k,s)}{\arg\min}\, E\{\|y(k,s) - x(k,s)\|^2\}$$

This results in the following weight vector and covariance matrix (leaving SC-FDMA/OFDM symbol counter s out for the moment):

$$\vec{w}(k) = \underset{w(k)}{\operatorname{argmin}} E\{|\vec{w}^H(k)H(k)H^H(k)\vec{w}(k)|x(k)|^2 +$$
$$\vec{w}^H(k)I(k)I^H(k)\vec{w}(k) + |x(k)|^2(1 - \vec{w}^H(k)(H(k) + I(k)/|x(k)|^2) -$$
$$(H^H(k) + I^H(k)/|x(k)|^2)\vec{w}(k))\}$$

$$\vec{w}(k,s) = (E\{I(k,s)I^H(k,s) + H(k,s)H^H(k,s)\})^{-1}H(k,s) = R_{rr}^{-1}(k,s)H(k,s)$$

and $$R_{rr}(k,s) = E\{I(k,s)I^H(k,s) + H(k,s)H^H(k,s)\}$$

For the interference term I(k, s), thermal noise N(k,s) and spectrally as well as spatially colored interference S(k,s) consisting of MediaFLO extra-system interference or UL ICIC implied interference or both may be taken into account:

$$I(k,s) = N(k,s) + S(k,s)$$

Hence, for 2 receive antennas and SC-FDMA/OFDM symbols this results in:

$$R_{rr}(k,s) = \begin{bmatrix} |n_1(k,s)|^2 + |S_1(k,s)|^2 + |H_1(k,s)|^2 & S_1(k,s)S_2^H(k,s) \\ S_1^H(k,s)S_2(k,s) & |n_2(k,s)|^2 + |S_2(k,s)|^2 + |H_2(k,s)|^2 \end{bmatrix}$$

Interference Rejection Combining in general would mean that the covariance matrix $R_{rr}(k,s)$ is derived for every sub-carrier k and every SC-FDMA/OFDM symbol s. This would be followed by a matrix inversion for each sub-band (here typically for each PRB) in each SC-FDMA symbol in order to obtain the weight factors for estimating the pre-coded transmit signal x(k,s) from the received signal r(k,s).

In some embodiments, Interference Rejection Combining by creating and inverting a covariance matrix per sub-band, with finest granularity to PRB level may be applied.

Figure 4:
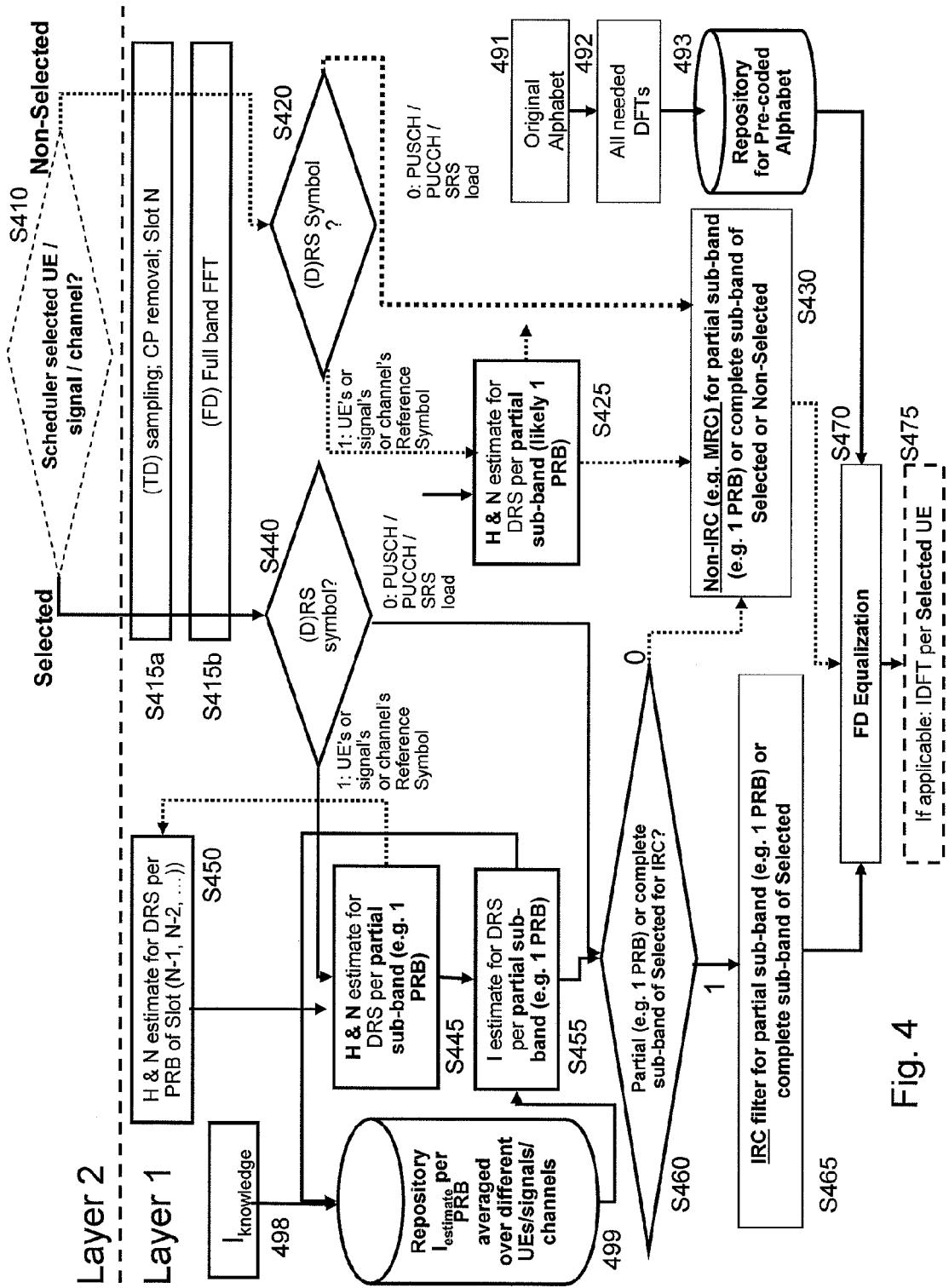
FIG. 4 shows a method of selective uplink IRC for SC-FDMA of LTE according to an embodiment.

FIG. 4 shows an embodiment of an exemplary IRC method illustrating how selective Uplink IRC may be performed in such a way that IRC is applied selectively inside the (pre-) selected UE's or signal's or channel's sub-band.

FIG. 4 illustrates an embodiment of a method of frequency-domain SC-FDMA Selective Uplink IRC. Some of the complexity reductions over the prior art are Pre-selection of UE/signal/channel by Layer 2 scheduler (S410);
Selection of partial sub-band (e.g. 1 PRB) of UE/signal/channel sub-band or selection of complete UE/signal/channel sub-band based on $I_{estimate}$ derived from spatial correlation of antennas used on e.g. individual PRBs and "long-term" averaged over different UEs/signals/channels (see repository 499) (S460).

In the following, a detailed description of an embodiment according to FIG. 4 is given:

In step S410, an interference-aware Uplink scheduler—based on the interference $I_{est}$ stored in the repository 499—may (pre-) select specific user equipments (UEs) or signals or channels for allocation in the heavily interfered part of the carrier spectrum. UEs or signals or channels in the heavily interfered part of the spectrum are then subject to IRC; those allocated in the less affected part of the spectrum are not. Thereby the interference-aware Uplink scheduler can further optimize IRC usage because IRC performs better e.g. on lower Modulation and Coding scheme.

Independent whether or not a UE/signal/channel is selected for allocation in the heavily interfered part of the carrier spectrum, the usual steps of layer 1 for each time step N are performed, such as time-domain sampling, removal of cyclic prefix (CP) (S415a), and the full band fast Fourier transformation (FFT) (S415b). Note that selective IRC may be performed both in the time domain and in the frequency domain.

If a UE or signal or channel is not selected, IRC is not applied. Then, in S420, if the processed OFDM symbol is a reference symbol, further processing includes channel and noise estimation (H&N) per partial sub-band (e.g. for a single PRB) (S425). This estimation is taken into account for the further non-IRC treatment of the data in S430, such as maximum ratio combining.

If a UE/signal/channel is selected, IRC may be applied on the complete or only on part of the sub-band covered by the selected UE/signal/channel.

First in S440 it is checked whether the OFDM symbol is a reference symbol. If this is the case, channel (H) and noise (N) estimation (S445) and interference estimation $I_{est}$ (S455) are performed per partial sub-band (e.g. for a single PRB). H & N estimation can be estimated by averaging over former time slots N-1, N-2, . . . and across UE/signal/channel sub-bands (see S450).

If decision S440 reveals that the OFDM symbol contains load instead, data will be fed to IRC (S465) if the corresponding part of the sub-band is selected for IRC by S460, or to the non-IRC processing (S430) if the corresponding part of the sub-band is not selected for IRC in step S460.

Depending on the interference estimation in S455, step S460 decides whether the complete sub-band belonging to the selected UE/signal/channel is subject to IRC (full sub-band fed through branch 1 of S460) or whether only part of the sub-band is subject to IRC (partial sub-band fed through branch 1 of S460), i.e. whether the estimated interference for the partial of the complete sub-band exceeds a certain threshold.

IRC processing is performed in S465 for the partial or the complete sub-band where this is required according to step S460, and not performed for the rest (S430).

After that, the uplink signal of the UEs/signals/channels having undergone IRC and those not having undergone IRC are all processed in frequency domain equalization (S470). In order to perform frequency domain equalization, a pre-coded alphabet from the repository 493 may be used. This pre-coded alphabet is derived from the original alphabet 491 and all needed discrete Fourier transformations 492.

For some channels, an inverse discrete Fourier transformation per selected UE may follow (S475).

In some embodiments, the repository 499 may be updated based on the estimated interference values of step S455. Also, in some embodiments, when running the method of FIG. 4 the first times, the repository may store values $I_{knowledge}$ (498) obtained e.g. from independent measurements or estimations of a colored interference. If the repository 499 is not updated, $I_{knowledge}$ values may be stored permanently in the repository 499.

Figure 5:
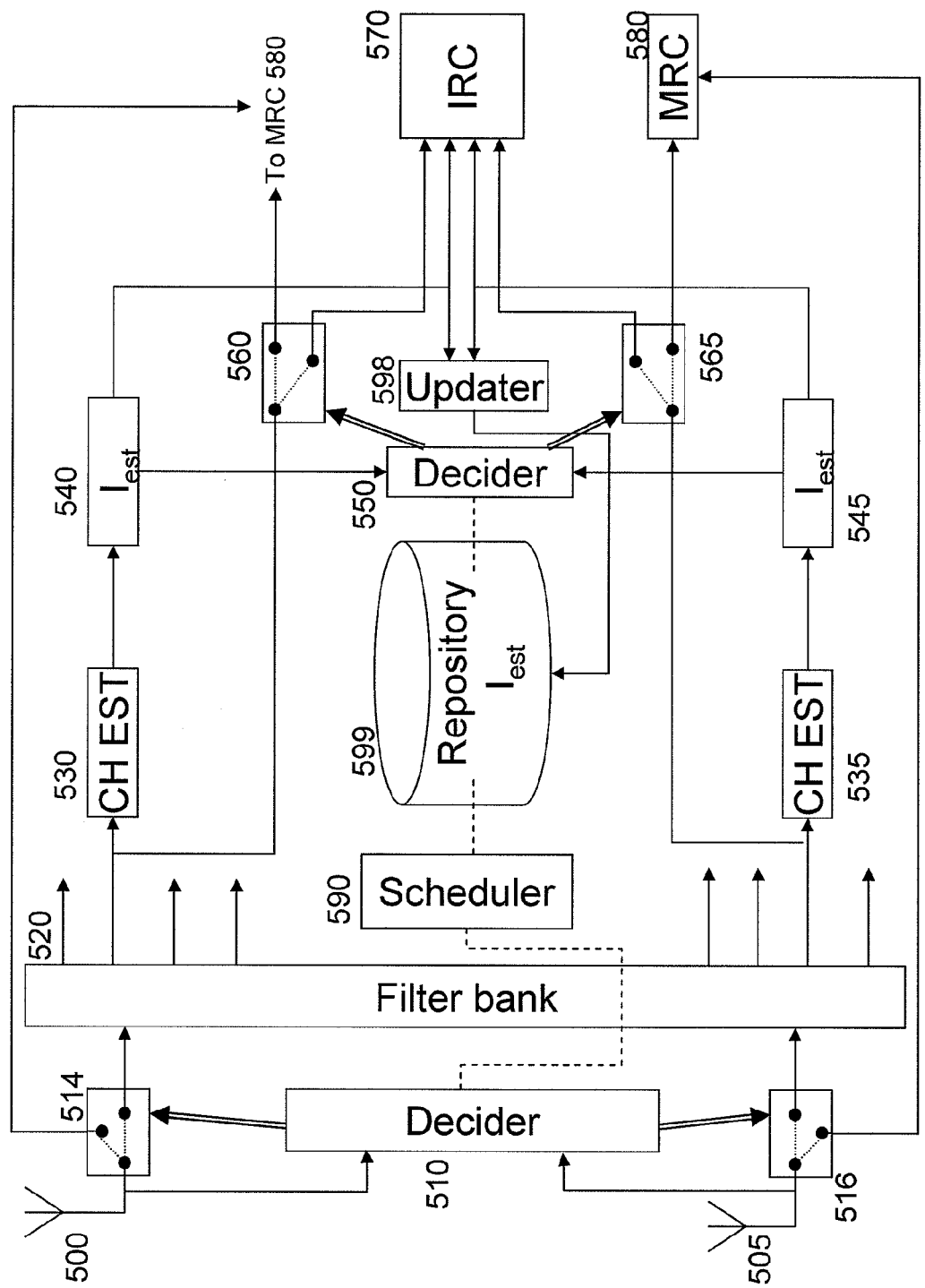
FIG. 5 shows an apparatus according to an embodiment.

Reference is made to FIG. 5, which shows an embodiment implementing selective interference rejection combining (IRC). The embodiment may be comprised in a radio receiver of a base station, e.g. of a LTE eNodeB.

A scheduler 590 schedules a UE/signal/channel according to an estimated interference value for colored interference stored in the repository 599. The repository may be a database, a memory or another means suitable for storing interference values temporarily or permanently.

An uplink signal is received via two diversity paths 500 and 505. The diversity paths may represent signals received via two respective reception antennas. Alternatively, the diversity paths 500 and 505 may represent diversity paths obtained by over-sampling, that is, the actual signal is received by one reception antenna, but the sampling rate at the receiver is double to the transmit symbol rate. The samples may alternately be directed to the first diversity path 500 and to the second diversity path 505. The two diversity paths 500 and 505 in FIG. 5 have only been shown as an example and there can be more than two diversity paths in the radio receiver.

In the decider 510, it is checked whether the user equipment/sounding reference signal or channel of the uplink signal is affected by colored interference more than a predefined threshold. This decision is based on the scheduling performed by the scheduler 590 and is the same for both diversity paths.

If it is decided that the user equipment/sounding reference signal or channel of the uplink signal is not affected by colored interference more than a predefined threshold, the switching elements 514 and 516 are set such that the uplink signal of both diversity paths is subjected to non-IRC treatment, e.g. maximum ratio combining (MRC) in step 580.

If the decider decides that the user equipment/sounding reference signal or channel of the uplink signal is affected by colored interference more than a predefined threshold, the switching elements 514 and 516 are set such that the uplink signal is forwarded to filter bank 520, where the uplink signal of each diversity path may be split into uplink signals of partial subbands. The filtering may be the same for the two diversity paths.

The filter bank 520 may be, for example, a generalized discrete Fourier transform (GDFT) based filter bank or a multi-rate polyphase filter bank. The filter bank may have a perfect reconstruction property. In some embodiments, other means to split the signal into a plurality of subbands may be used.

The number of frequency sub-bands may vary according to the desired implementation and properties of the telecommunication system and the channel. The filter bank 520 may carry out a pulse shaping operation, in which case there is no need for a separate pulse shaping filter. The filter bank 520 may also convert each partial frequency subband from the intermediate frequency to a base band. The signal of each partial subband may be processed separately. For simplicity, the further processing is shown for a single partial subband per diversity path only.

The data rate may be reduced to fulfill the Nyquist criterion, and channel and noise (H&N) may be estimated in the channel estimators 530 and 535, e.g. based on reference symbols. Interference estimate signals $y_1[n]$, $y_2[n]$ for each diversity path may be obtained from the estimators 540 and 545.

The interference estimation may comprise calculation of an interference covariance matrix which may be calculated according to the following equation:

$$R = E(y\,y^H)$$

where E denotes an expected value, y is an interference signal matrix composed of the interference estimate signals $y_1[n]$ and $y_2[n]$, and H denotes a complex conjugate transpose operation.

In the decider 550, it is decided, whether the respective partial subband is likely to be affected by colored interference. The decision is based on the estimated interference parameters $I_{est}$ which may be stored in the repository 599. The decision may be e.g. checking, if the interference for the partial subband exceeds a certain predefined threshold.

If the partial subband is not sufficiently affected by colored interference, the decider 550 sets the switching elements 560, 565 such that the partial subband is further processed without IRC. For example, the partial subbands of the two diversity paths may be subjected to maximum ratio combining (MRC) in step 580.

The switching elements 560, 565, 514, and 516 may be based on any kind of hardware, software or firmware suitable for that purpose.

If the partial subband is sufficiently affected by colored interference, the partial subband of both diversity paths, through switching elements 560, 565 is subjected to IRC in an interference cancellation block 570. The interference cancellation block 570 takes as input signals the original input uplink signal of the partial subband. Additionally, the estimators 540, 545 provide the interference cancellation block 570 with the interference cancellation parameters.

The estimated interference from the estimators 540, 545 may also be forwarded to an updater 598. The updater may then update the repository 599 based on the estimated interferences.

In some embodiments, the interference value $I_{est}$ in the repository may be updated with every data burst, based on the interference estimated in at least one of the estimators 540, 545, while in other embodiments it may be updated only at selected intervals or data bursts, or it may not be updated at all, i.e. the interference $I_{est}$ may be preconfigured and does not change with time.

Furthermore, the updating may comprise a step of averaging of the estimated interferences, e.g. "long-term" averaging over time and/or across different UEs and/or different signals and/or different channels allocated at different times. The estimated interference values of a partial subband may be stored separately per diversity path, or one value for all diversity paths may be stored. This value may be obtained e.g. by averaging over the diversity paths, or by weighted averaging, or from one of the diversity paths only.

In some embodiments, the division of the data burst into partial subbands may be performed only before the estimators 540, 545.

For example, described above are apparatuses, methods and computer program products capable of avoiding or reducing the complexity in interference suppression. In particular, it is provided a method, comprising deciding, based on a previously estimated interference value, whether a user equipment or a sounding reference signal or a channel of a received uplink signal is affected by a colored interference more than a first predefined threshold, wherein colored interference is an interference having a spatial and/or spectral predominance; and suppressing interference rejection combining on the uplink signal if none of the user equipment, the sounding reference signal, and the channel of the received uplink signal is affected more than the first predefined threshold.

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. A method, comprising
deciding, based on a previously estimated interference value, whether a user equipment or a sounding reference signal or a channel of a received uplink signal is affected by a colored interference more than a first predefined threshold, wherein colored interference is an interference having a spatial predominance or spectral predominance or both; and
suppressing interference rejection combining on the uplink signal if none of the user equipment, the sounding reference signal, and the channel of the received uplink signal is affected more than the first predefined threshold.

2. The method according to claim 1, further comprising
performing interference rejection combining for the uplink signal, if it is decided that at least one of the user equipment, the sounding reference signal, and the channel is affected by colored interference more than the first predefined threshold.

3. The method according to claim 1, wherein the uplink signal comprises more than one partial subband including a first partial subband, the method further comprising
splitting the uplink signal into an uplink signal of the first partial subband and at least one uplink signal of the remaining subband;
deciding, based on a previously estimated interference value of the first partial subband, whether or not the uplink signal of the first partial subband is affected by colored interference more than a second predefined threshold; and wherein
the performing interference rejection combining for the uplink signal comprises suppressing interference rejection combining for the uplink signal of the first partial subband, if it is decided that the uplink signal of the first partial subband is not affected more than the second predefined threshold.

4. The method according to claim 3, wherein the uplink band comprises more than one subband, the method further comprising
selecting at least one of the subbands affected more than the first predefined threshold into a first selection, or selecting at least one of the subbands affected not more than the first predefined threshold into a second selection, or both; and
allocating at least one of the subbands of the first selection to the user equipment, the sounding reference signal, or the channel according to a first predefined criterion, and/or allocating at least one of the subbands of the second selection to the user equipment, the signal, or the channel according to a second predefined criterion.

5. The method according to claim 4, wherein the deciding is based on the allocating.

6. The method according to claim 4, further comprising
estimating a colored interference of the uplink signal or, of the uplink signal of the first partial subband; and
updating the interference value of the subband or of the first partial subband based on the estimated colored interference.

7. The method according to claim 6, further comprising
averaging the estimated colored interference over at least one of time, different user equipments, different sounding reference signals, and different channels; and wherein
the updating is based on the averaged estimated colored interference.

8. The method according to claim 1, wherein the uplink is an uplink of a single carrier frequency division multiplex access, and wherein performing interference rejection combining in the frequency domain for data and demodulation reference symbols of a pilot is performed with respect to a pre-coded transmit alphabet.

9. An apparatus, comprising
at least one processor, and
at least one memory including computer program code,
wherein the at least one memory and the computer code are configured, with the at least one processor, to cause the apparatus to at least perform the following:
deciding, based on a previously estimated interference value, whether or not a user equipment or a sounding reference signal or a channel of an uplink signal is affected by a colored interference more than a first predefined threshold, wherein colored interference is an interference having a spatial predominance or spectral predominance or both; and
suppressing interference rejection combining on the uplink signal if none of the user equipment, the sounding reference signal, and the channel of the received uplink signal is affected more than the first predefined threshold.

10. The apparatus according to claim 9, wherein the at least one memory and the computer code are further configured, with the at least one processor, to cause the apparatus to at least perform the following:
performing interference rejection combining on the uplink signal, if it is decided that at least one of the user equipment, the sounding reference signal, and the channel is affected by colored interference more than the first predefined threshold.

11. The apparatus according to claim 9, wherein the uplink signal comprises more than one partial subband including a first partial subband, and wherein the at least one memory and the computer code are further configured, with the at least one processor, to cause the apparatus to at least perform the following:
splitting the uplink signal into an uplink signal of the first partial subband and at least one uplink signal of the remaining subband;
deciding, based on a previously estimated interference value of the first partial subband, whether or not the uplink signal of the first partial subband is affected by colored interference more than a second predefined threshold;
wherein the performing interference rejection combining for the uplink signal comprises suppressing interference rejection combining for the uplink signal of the first partial subband, if it is decided that the uplink signal of the first partial subband is not affected more than the second predefined threshold.

12. The apparatus according to claim 11, wherein the uplink band comprises more than one subband, and wherein the at least one memory and the computer code are further configured, with the at least one processor, to cause the apparatus to at least perform the following:
selecting at least one of the subbands affected more than the first predefined threshold into a first selection or selecting at least one of the subbands affected not more than the first predefined threshold into a second selection or both; and allocating at least one of the subbands of the first selection to the user equipment, the sounding reference signal, or the channel according to a first predefined criterion, and/or allocating at least one of the subbands of the second selection to the user equipment, the sounding reference signal, or the channel according to a second predefined criterion.

13. The apparatus according to claim 12, wherein the deciding is based on the allocating.

14. The apparatus according to claim 12, wherein the at least one memory and the computer code are further configured, with the at least one processor, to cause the apparatus to at least perform the following:

estimating a colored interference of the uplink signal or, of the uplink signal of the first partial subband; and updating the interference value of the subband or of the first partial subband based on the estimated colored interference.

15. The apparatus according to claim 14, wherein the at least one memory and the computer code are further configured, with the at least one processor, to cause the apparatus to at least perform the following:

averaging the estimated colored interference over at least one of a time, different user equipments, different signals, and different channels; and the updating the interference value of the subband or the first partial subband based on the averaged estimated colored interference.

16. The apparatus according to claim 9, wherein the at least one memory and the computer code are further configured, with the at least one processor, to cause the apparatus to at least perform the following:

providing base station functionality according to a radio access technology of the uplink.

17. An eNodeB of a long term evolution system comprising an apparatus according to claim 9.

18. A computer program product embodied on a non-transitory computer-readable medium, in which a computer program is stored which, when being executed by a computer, is configured to provide instructions to control or carry out the method according to claim 1.

* * * * *